United States Patent
Ip et al.

(10) Patent No.: US 11,378,443 B2
(45) Date of Patent: Jul. 5, 2022

(54) PERFORMANCE OF RAYLEIGH-BASED PHASE-OTDR WITH CORRELATION-BASED DIVERSITY COMBINING AND BIAS REMOVAL

(71) Applicant: NEC Laboratories America, Inc., Princeton, NJ (US)

(72) Inventors: Ezra Ip, West Windsor, NJ (US); Yue-Kai Huang, Princeton, NJ (US)

(73) Assignee: NEC Corporation

( * ) Notice: Subject to any disclaimer, the term of this patent is extended or adjusted under 35 U.S.C. 154(b) by 0 days.

(21) Appl. No.: 16/879,407

(22) Filed: May 20, 2020

(65) Prior Publication Data

US 2020/0370949 A1 Nov. 26, 2020

Related U.S. Application Data

(60) Provisional application No. 62/851,170, filed on May 22, 2019.

(51) Int. Cl.
| | |
|---|---|
| H04B 10/08 | (2006.01) |
| H04B 17/00 | (2015.01) |
| G01H 9/00 | (2006.01) |
| H04B 10/071 | (2013.01) |
| G01B 9/0209 | (2022.01) |

(52) U.S. Cl.
CPC .......... *G01H 9/004* (2013.01); *G01B 9/0209* (2013.01); *H04B 10/071* (2013.01)

(58) Field of Classification Search
CPC .................................................. H04B 10/071
See application file for complete search history.

(56) References Cited

U.S. PATENT DOCUMENTS

| | | | |
|---|---|---|---|
| 6,591,025 B1* | 7/2003 | Siems | G01H 3/005 385/12 |
| 6,913,079 B2* | 7/2005 | Tubel | E21B 47/135 166/250.01 |
| 2008/0297772 A1* | 12/2008 | Rogers | G01M 11/3118 356/73.1 |
| 2009/0103100 A1* | 4/2009 | Froggatt | G01M 11/083 356/477 |
| 2009/0114386 A1* | 5/2009 | Hartog | E21B 43/26 166/250.08 |
| 2012/0188533 A1* | 7/2012 | Crickmore | G01H 9/004 356/73.1 |
| 2012/0255362 A1* | 10/2012 | Den Boer | G01H 9/004 73/655 |
| 2012/0278043 A1* | 11/2012 | Lewis | G01D 5/35387 702/189 |
| 2012/0297883 A1* | 11/2012 | Kupershmidt | G01H 9/004 73/655 |
| 2017/0010385 A1* | 1/2017 | Englich | G01D 5/35303 |
| 2017/0045410 A1* | 2/2017 | Crickmore | G01M 3/047 |
| 2017/0199075 A1* | 7/2017 | Lewis | G01D 5/35329 |
| 2017/0211970 A1* | 7/2017 | Milione | G01H 9/004 |
| 2017/0350734 A1* | 12/2017 | Ji | G01D 5/35306 |
| 2018/0045543 A1* | 2/2018 | Farhadiroushan | G01H 9/004 |

(Continued)

*Primary Examiner* — David C Payne
*Assistant Examiner* — Pranesh K Barua
(74) *Attorney, Agent, or Firm* — Joseph Kolodka (57) ABSTRACT

Aspects of the present disclosure describe systems, methods and apparatus for improving the performance of Rayleigh-based phase-OTDR with correlation-based diversity combining and bias removal.

4 Claims, 8 Drawing Sheets

(56) References Cited

U.S. PATENT DOCUMENTS

| | | | |
|---|---|---|---|
| 2019/0128731 A1* | 5/2019 | Cedilnik | G01H 9/004 |
| 2019/0277707 A1* | 9/2019 | Lecoeuche | G01K 11/32 |
| 2019/0369276 A1* | 12/2019 | Barfoot | G01V 1/226 |
| 2020/0225079 A1* | 7/2020 | Cedilnik | H04B 10/071 |
| 2020/0284647 A1* | 9/2020 | Hveding | G01V 1/208 |

* cited by examiner

PERFORMANCE OF RAYLEIGH-BASED PHASE-OTDR WITH CORRELATION-BASED DIVERSITY COMBINING AND BIAS REMOVAL

CROSS REFERENCE

This disclosure claims the benefit of U.S. Provisional Patent Application Ser. No. 62/851,170 filed May 22, 2019 the entire contents of which is incorporated by reference as if set forth at length herein.

TECHNICAL FIELD

This disclosure relates generally to distributed sensing systems, methods, and structures. More particularly, it describes improving performance of Rayleigh-based phase-OTDR with correlation-based diversity combining and bias removal.

BACKGROUND

Distributed acoustic sensing (DAS) using coherent Rayleigh backscattering in an optical fiber has become a ubiquitous technique for monitoring multiple dynamic events in real time, thanks to its interesting applications in numerous safety, security, and integrity monitoring systems. A noted problem with DAS systems however is that in certain circumstances they are susceptible to phase noise and phase discontinuity.

SUMMARY

The above problem is solved and an advance in the art is made according to aspects of the present disclosure directed to Rayleigh backscatter-based DAS systems.

Viewed from a first aspect, the present disclosure is directed to distributed acoustic sensing (DAS) systems using phase optical time-domain reflectometry based on Rayleigh scattering comprising an optical interrogator unit that generates optical pulses at one or more optical frequencies and introduces them into an optical fiber under test; a receiver unit that detects Rayleigh backscatter from the optical fiber, and a data processor unit that determines acoustic vibrations experienced by the optical fiber by computing a plurality of delay interferometric products based on different combinations of polarizations and/or frequencies of the received Rayleigh backscatter, adding the interferometric products in phase by aligning their vectors using correlation, followed by bias removal at ever fiber position.

Viewed from another aspect, the present disclosure is directed to such systems wherein the receiver detects the Rayleigh backscatter at each transmitted optical frequency using a plurality of coherent receivers.

Finally, viewed from still another aspect, the present disclosure is directed to such systems wherein the receiver detects the Rayleigh backscatter at each transmitted optical frequency using a plurality of optical delay interferometers.

BRIEF DESCRIPTION OF THE DRAWING

A more complete understanding of the present disclosure may be realized by reference to the accompanying drawing in which:

FIG. 1(A) and FIG. 1(B) schematically illustrate.

FIG. 2(A), FIG. 2(B), and FIG. 2(C) schematically illustrate.

FIG. 3(A) and FIG. 3(B) are schematic diagrams illustrating: FIG. 4(A) and FIG. 4(B) are schematic diagrams illustrating: FIG. 3(A), alternative system architecture for frequency-division multiplexed (FDM) φ-OTDR using hardware delay interferometers at each wavelength.

The illustrative embodiments are described more fully by the Figures and detailed description. Embodiments according to this disclosure may, however, be embodied in various forms and are not limited to specific or illustrative embodiments described in the drawing and detailed description.

DESCRIPTION

The following merely illustrates the principles of the disclosure. It will thus be appreciated that those skilled in the art will be able to devise various arrangements which, although not explicitly described or shown herein, embody the principles of the disclosure and are included within its spirit and scope.

Furthermore, all examples and conditional language recited herein are intended to be only for pedagogical purposes to aid the reader in understanding the principles of the disclosure and the concepts contributed by the inventor(s) to furthering the art and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that any block diagrams herein represent conceptual views of illustrative circuitry embodying the principles of the disclosure.

Unless otherwise explicitly specified herein, the FIGS. comprising the drawing are not drawn to scale.

By way of some additional background, we note that differential detection of Rayleigh backscatter is a well-known technique used in distributed acoustic sensing (DAS). To better understand it operationally, consider r(z) is the scalar value of the Rayleigh back-reflection at position z along a fiber. A longitudinal stress of a between two points z and z+Δz will cause their optical distance to stretch by δz=σEΔz, where E is the Young's modulus of glass. In presence of an acoustic vibration which causes time-varying longitudinal stress of σ(t), the differential product of Rayleigh backscatter may be phase modulated:

$$r(z+\Delta z)r^*(z) = |r(z+\Delta z)||r(z)|\exp\left(-j\frac{2\pi n}{\lambda}E\Delta z\sigma(t)\right), \quad (1)$$

where n phase velocity index of the fiber and λ is the wavelength of interrogation.

In a conventional DAS system, the interrogator transmits rectangular pulses p(t)=rect(t/T) down the fiber under test (FUT), where the pulse width T corresponds to spatial resolution of $z_{res}=(c/2n_{eff})T$, with c being the speed of light and $n_{eff}$ being the group index of pulse propagation down the fiber. The received Rayleigh backscatter is given by convolution:

$$q(t)=\int_{-\infty}^{\infty}p(t)r(t-\tau)d\tau \quad [2]$$

with time-of-flight t related to fiber position by $z=(c/2n_{eff})t$. When the FUT undergoes longitudinal stretching, each infinitesimal Rayleigh reflection component r(t) will undergo phase shift according to Eq. (1). The output q(t) will experience amplitude fading when the components r(t) add destructively in phase. Hence, the delay interferometric product $q(t)q^*(t-T_i)$ where $T_i$ is the delay of the interferometer will not only have phase modulation, but will also suffer from "Rayleigh fading". When either |q(t)| or |q(t−T_i)| are close to zero, receiver noise will make the phase of the delay interferometric product susceptible to phase noise and phase discontinuity.

Diversity Combining

It is possible to mitigate Rayleigh fading by using 'diversity'. Methods of achieving diversity includes:

(i) Polarization diversity: Polarization rotation of both the transmitted pulse and the Rayleigh backscatter during propagation means that the received signal $q(t)=[x(t)\ y(t)]^T$ will have two polarization components. It is possible to construct four delay interferometric products $x(t)x^*(t-T_i)$, $x(t)y^*(t-T_i)$, $y(t)x(t-T_i)$ and $y(t)y^*(t-T_i)$, and combine them in such fashion to mitigate fading.

(ii) Spatial diversity: It is possible to combine delay interferometric products based on $q(t_1), \ldots, q(t_k)$ for fiber positions $\{z_1, \ldots, z_k\}$ within a neighborhood. Unfortunately, this will sacrifice spatial resolution.

(iii) Frequency diversity: It is possible to transmit pulses at different wavelengths spaced far enough apart so that the delay interferometric products based on $q_1(t), \ldots, q_N(t)$ fade independently. This may require more hardware and more digital signal processing at the receiver.

Irrespective of whether (i)-(iii), or a combination of these techniques are used, a method to combine delay interferometric products arising from different sources is necessary. Let $b_1[l,m], \ldots, b_{N_b}[l,m]$ represent $N_b$ delay interferometric products to be combined, where l is the position index, and m is the time index which assumes the acoustic vibration is sampled at a rate of $T_f$ equal to the pulse repetition period. All of the $b_k[l,m]$ terms are identically phase-modulated by the longitudinal vibration at that fiber position $$\left(\text{i.e., } \sim \exp\left(-j\frac{2\pi n}{\lambda}E\Delta z\sigma(mT_f)\right)\right)$$

as per Eq. (1)). However, the amplitudes of each individual $|b_k[l,m]|$ may fade at certain time indices m. Diversity combining computes:

$$\zeta[l,m] = \sum_{k=1}^{N_b} b_k[l,m]\exp(-j\varphi_{l,k}) \quad [3]$$

where $\varphi_{l,k}$ are phases to be found which adds the vectors $b_k[l,m]$ constructively, and maximizing the amplitude and signal-to-noise ratio (SNR) of the resultant vector $\zeta[l,m]$.

Figure 1A:
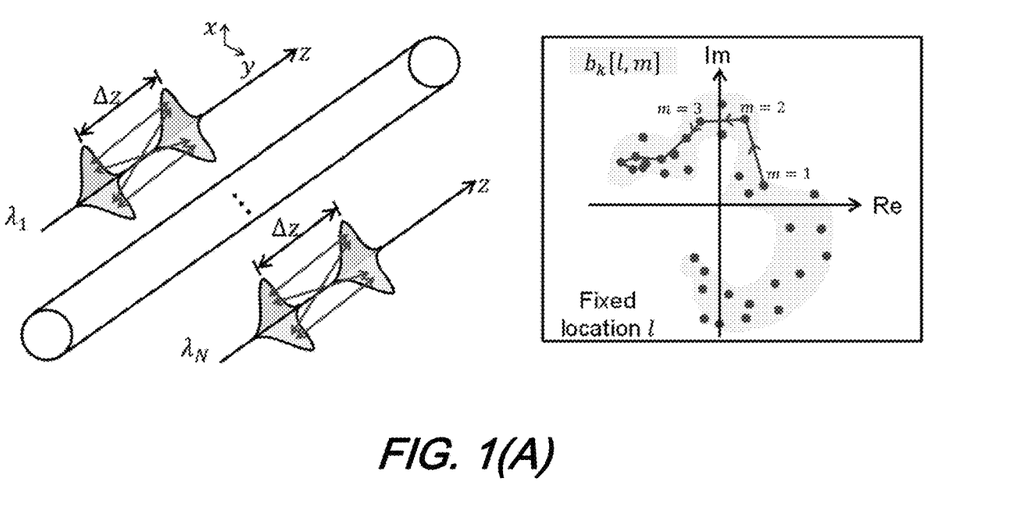
FIG. 1(A), in frequency-division multiplexed φ-OTDR, four delay interferometric products can be computed for each wavelength based on the two fiber polarizations. The inset illustrates the time evolution of $b_k[l, m]$ at a fixed location l. Non-constant amplitude is the result of Rayleigh fading, whereas phase evolution is the result of longitudinal vibration along the fiber axis z, which causes the optical distance Δz to change with time.
Figure 1B:
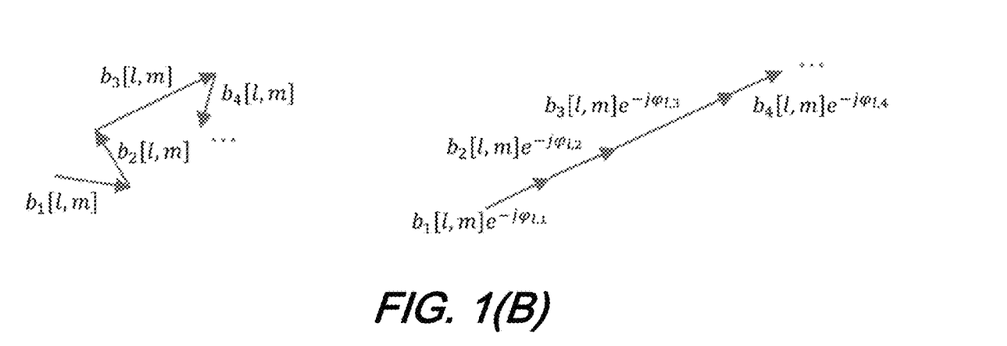
FIG. 1(B) shows summing the $b_k[l, m]$ in phase causes the resultant $ζ[l, m]$ to have larger amplitude and higher SNR.

FIG. 1(A) and FIG. 1(B) schematically illustrate: FIG. 1(A), in frequency-division multiplexed φ-OTDR, four delay interferometric products can be computed for each wavelength based on the two fiber polarizations. The inset illustrates the time evolution of $b_k[l,m]$ at a fixed location l. Non-constant amplitude is the result of Rayleigh fading, whereas phase evolution is the result of longitudinal vibration along the fiber axis z, which causes the optical distance Δz to change with time. FIG. 1(B) shows summing the $b_k[l,m]$ in phase causes the resultant $\zeta[l,m]$ to have larger amplitude and higher SNR.

It is noted that the literature mentions adding the vectors $b_k[l,m]$ in a different context, (See, e.g., D. Chen, Q. Liu and Z. he, "Phase-detection distributed fiber-optic sensor without fading-noise based on time-gated digital OFDR," Opt. Exp. Vol. 25, no. 7, pp. 8315-8325, April 2017), but does not provide a method for finding the phase rotations $\varphi_{l,k}$. The literature also does not mention that the resultant vector $\zeta[l,m]$ can be biased in practice, and that an arc centering algorithm is required prior to taking the unwrapped angle in order to mitigate phase discontinuities, reduce phase noise and reduce phase nonlinearity Correlation with Maximum We propose the following method for finding $\varphi_{l,k}$. First, we pick a suitable window size of M samples. We then find the $b_k[l, m]$ term which has the highest power:

$$k_0 = \max_k \left( \sum_{m=1}^{M} |b_k[l, m]|^2 \right) \quad [4]$$

The optimum phase can be found by correlating the remaining terms with $b_{k_0}[l, m]$:

$$\varphi_{l,k} = \text{angle}\left( \sum_{m=1}^{M} b_k[l, m] b_{k_0}^*[l, m] \right) \quad [5]$$

The operations in Eq. (4) and (5) are repeated for every fiber position l. After combining as per Eq. (3), the unwrapped phase of $\varphi[l, m]$ should indicate the vibration at every fiber position. Once the combining phases $\varphi_{l,k}$ are found, they can be updated infrequently at most every M frames.

Arc Centering Algorithm

Figure 2A:
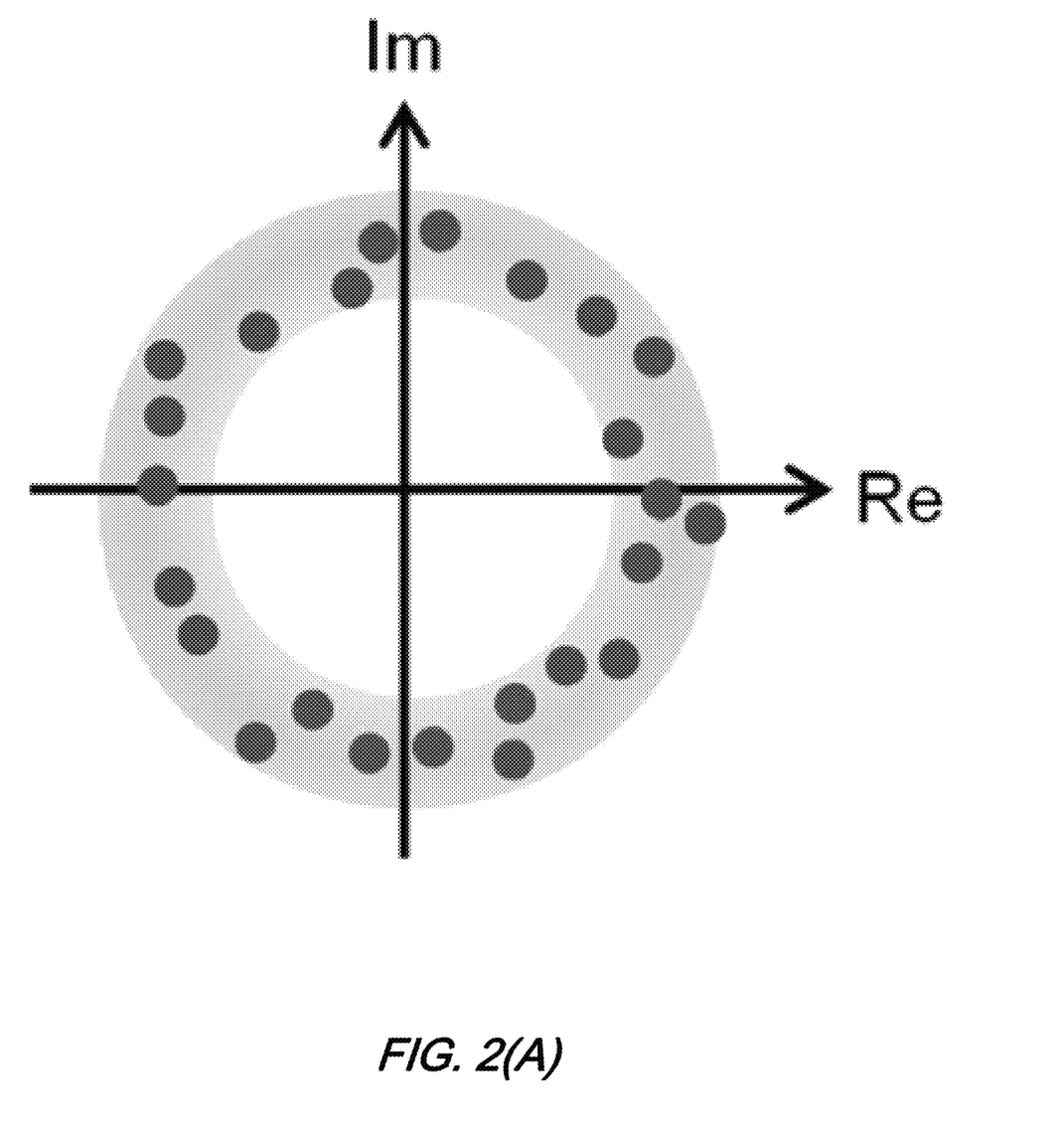
FIG. 2(A), an ideal arc traced by $ζ[l, m]$ at a given fiber position/in the absence of fading.
Figure 2B:
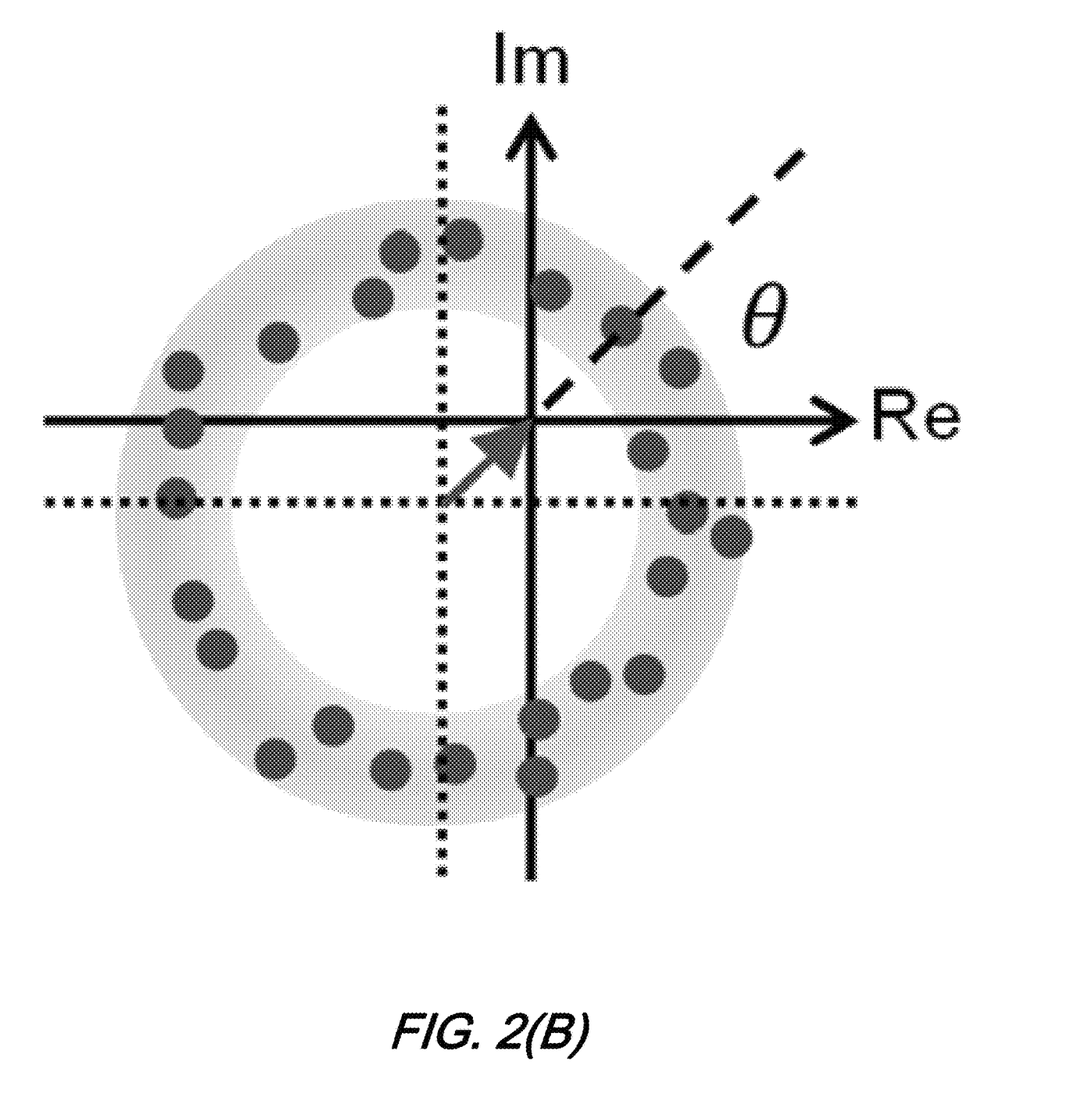
FIG. 2(B), actual $ζ[l, m]$ observed in practice due to "bias" represented by the purple arrow.
Figure 2C:
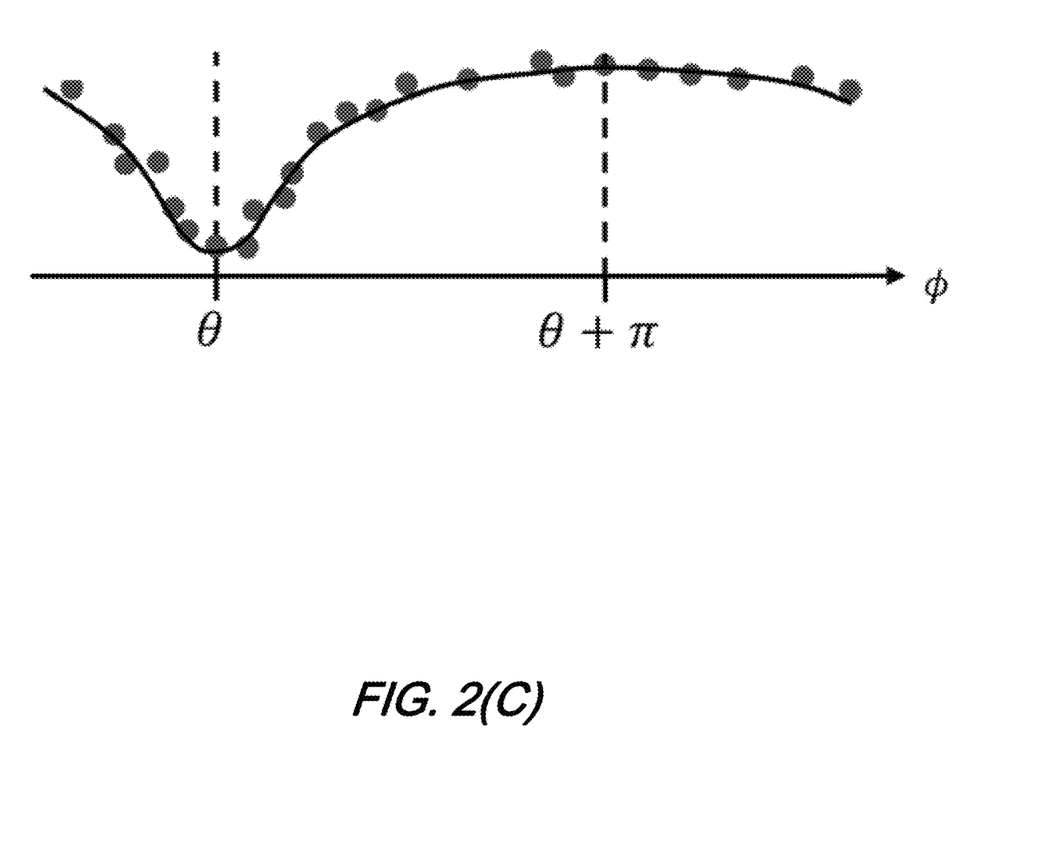
FIG. 2(C), amplitude vs phase of $ζ[l, m]$. Bias can be estimated from the Fourier coefficients obtained by least-squares fitting.

FIG. 2(A), FIG. 2(B), and FIG. 2(C) schematically illustrate: FIG. 2(A), an ideal arc traced by $\zeta[l, m]$ at a given fiber position l in the absence of fading. FIG. 2(B), actual $\zeta[l, m]$ observed in practice due to "bias" represented by the purple arrow. FIG. 2(C), amplitude vs phase of $\zeta[l, m]$. Bias can be estimated from the Fourier coefficients obtained by least-squares fitting.

Diversity combining should result in $\zeta[l, m]$ having less amplitude fluctuations than any individual term $b_k[l, m]$. Ideally, $\zeta[l, m]$ should trace out an arc of constant amplitude, and its phase is directly proportional to instantaneous strain, for every fiber position l. In practice, it has been observed that $\zeta[l, m]$ is not necessarily centered about the origin in the complex plane (FIG. 2(B)). The cause of the bias is uncertain but may be the result of DC blocker before the analog-to-digital converter (ADC) in a coherent receiver. Bias will result in greater susceptibility to phase discontinuity when $\zeta[l, m]$ pass through the origin due to fading and noise. To mitigate again phase discontinuities, an arc centering algorithm is required.

In FIG. 2(C), it is observed that in presence of bias, amplitude $R_{l,m} = |\zeta[l, m]|$ will be a function of phase $\phi_{l,m} \angle \zeta[l, m]$. Neglecting fading, $R_{l,m}$ should have a minimum at $\theta$ and a maximum at $\theta+\pi$. Since $R_{l,m}$ is a periodic function of $\phi_{l,m}$, the bias can be estimated by first performing a least squares (LS) fit of $R_{l,m}$ using sine waves, i.e.:

$$R_l = a_{l,0} + \sum_{i=1}^{N_{ord}} a_{l,i}\cos(i\phi_l) + b_{l,i}\sin(i\phi_l) \quad [6]$$

subject to minimizing the mean squared error $\sum_{m=1}^{M}|R_l - R_{l,m}|^2$. Let $c_l = [a_{l,0}\ a_{l,1}\ \ldots\ b_{l,1}\ \ldots]^T$ be the vector of the LS coefficients. It can be shown that $c = S_{l,\phi\phi}^{-1} S_{l,R\phi}$, where $$S_{l,\phi\phi} = \begin{bmatrix} \sum_m 1 & \sum_m \cos(\phi_{l,m}) & \sum_m \cos(3\phi_{l,m}) \\ \sum_m \cos(\phi_{l,m}) & \sum_m \cos(\phi_{l,m})\cos(\phi_{l,m}) & \sum_m \cos(\phi_{l,m})\cos(3\phi_{l,m}) \\ \sum_m \cos(3\phi_{l,m}) & \sum_m \cos(3\phi_{l,m})\cos(\phi_{l,m}) & \sum_m \cos(3\phi_{l,m})\cos(3\phi_{l,m}) \\ & \vdots & \\ \sum_m \sin(\phi_{l,m}) & \sum_m \sin(\phi_{l,m})\cos(\phi_{l,m}) & \sum_m \sin(\phi_{l,m})\cos(3\phi_{l,m}) \\ \sum_m \sin(3\phi_{l,m}) & \sum_m \sin(3\phi_{l,m})\cos(\phi_{l,m}) & \sum_m \sin(3\phi_{l,m})\cos(3\phi_{l,m}) \\ & \vdots & \\ \cdots & \sum_m \cos(\phi_{l,m})\sin(\phi_{l,m}) & \sum_m \cos(\phi_{l,m})\sin(3\phi_{l,m}) & \cdots \\ & \sum_m \cos(3\phi_{l,m})\sin(\phi_{l,m}) & \sum_m \cos(3\phi_{l,m})\sin(3\phi_{l,m}) & \\ \ddots & \vdots & & \\ & \sum_m \sin(\phi_{l,m})\sin(\phi_{l,m}) & \sum_m \sin(\phi_{l,m})\sin(3\phi_{l,m}) & \\ \cdots & \sum_m \sin(3\phi_{l,m})\sin(\phi_{l,m}) & \sum_m \sin(3\phi_{l,m})\sin(3\phi_{l,m}) & \cdots \\ & \vdots & & \ddots \end{bmatrix} \quad [7]$$

$$S_{l,R\phi} = \begin{bmatrix} \sum_m R_{l,m} \\ \sum_m R_{l,m}\cos(\phi_{l,m}) \\ \sum_m R_{l,m}\cos(3\phi_{l,m}) \\ \vdots \\ \sum_m R_{l,m}\sin(\phi_{l,m}) \\ \sum_m R_{l,m}\sin(3\phi_{l,m}) \\ \vdots \end{bmatrix} \quad [8]$$

The bias is then given by $o_l = \sum_{i=1}^{N_{ord}} a_{l,i} + jb_{l,i}$. Following bias removal $\zeta[l, m] = \zeta[l, m] - o_l$, the vibration at every fiber position can be found from the unwrapped phase of $\zeta[l, m]$.

System Architecture

We assume the use of frequency-division multiplexed (FDM) φ-OTDR and consider conventional φ-OTDR to be a special case with only one wavelength being transmitted and received.

Figure 3A:
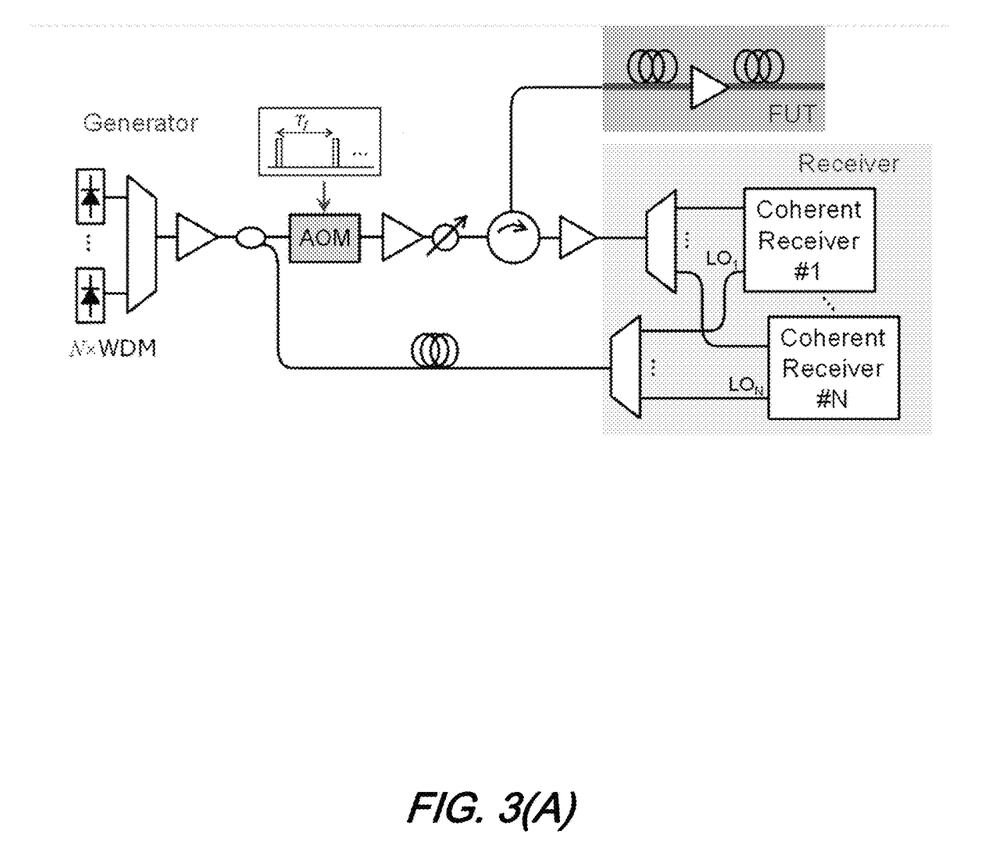
FIG. 3(A), system architecture for frequency-division multiplexed (FDM) φ-OTDR using coherent receivers to recover the electric fields of each Rayleigh backscatter.
Figure 3B:
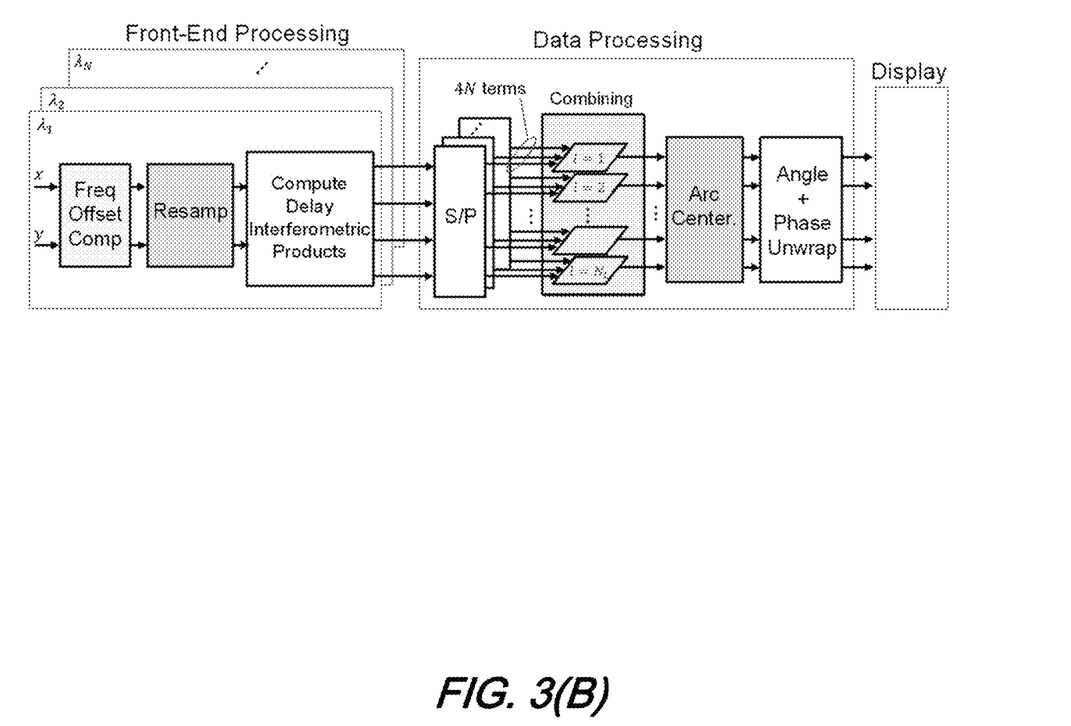
FIG. 3(B), digital signal processing architecture for FDM φ-OTDR using coherent receivers. Four delay interferometric products are computed per wavelength, resulting in 4N terms at each fiber position that are optimally combined followed by arc centering. The acoustic vibration at each fiber position is then estimated by taking the unwrapped phase.

FIG. 3(A) and FIG. 3(B) are schematic diagrams illustrating: FIG. 3(A), system architecture for frequency-division multiplexed (FDM) φ-OTDR using coherent receivers to recover the electric fields of each Rayleigh backscatter. FIG. 3(B), digital signal processing architecture for FDM φ-OTDR using coherent receivers. Four delay interferometric products are computed per wavelength, resulting in 4N terms at each fiber position that are optimally combined followed by arc centering. The acoustic vibration at each fiber position is then estimated by taking the unwrapped phase.

Figure 4A:
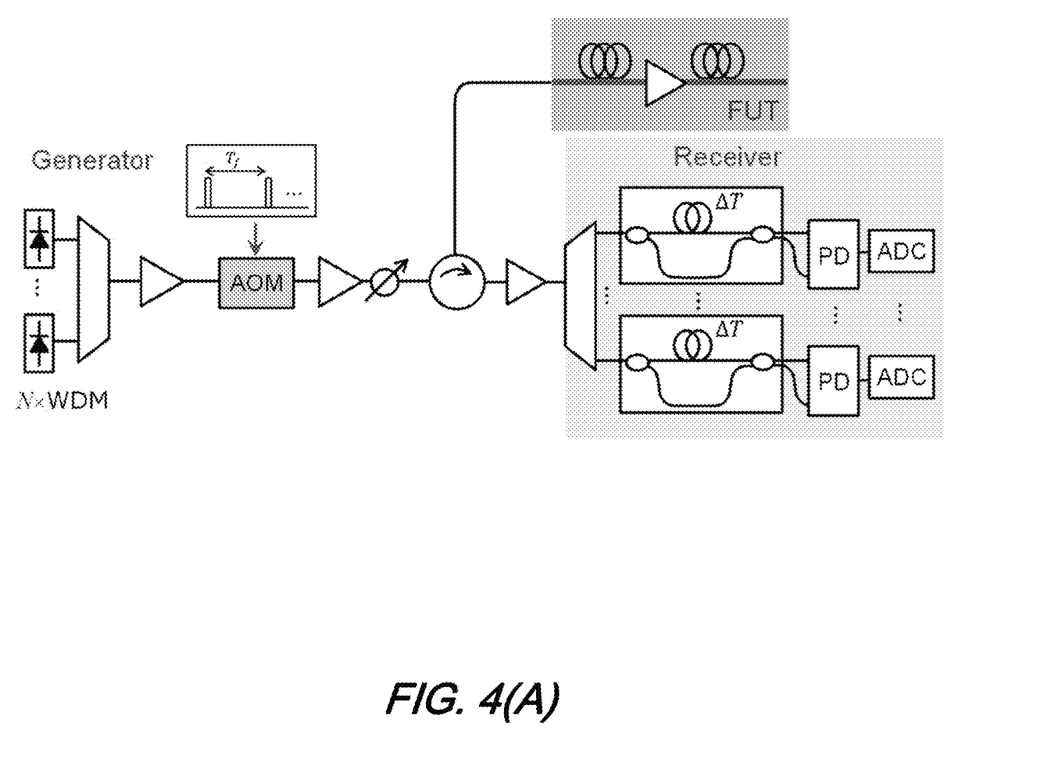
Figure 4B:
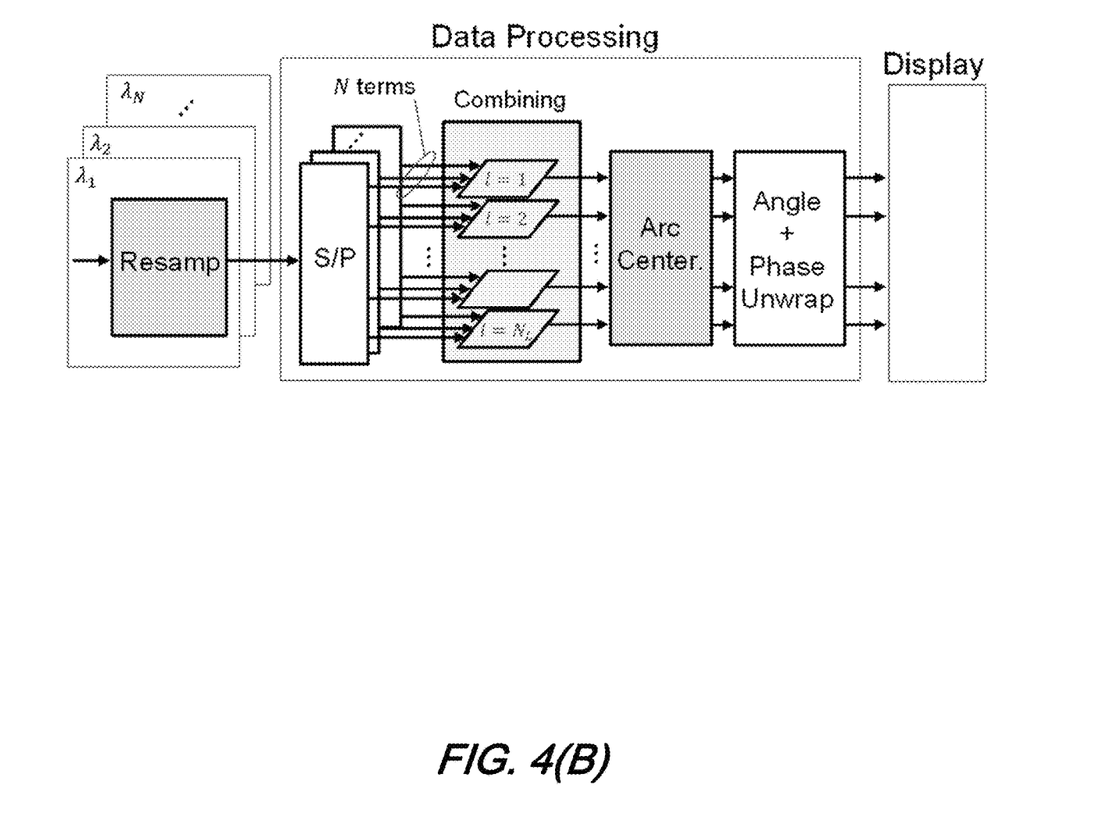
FIG. 4(B), alternative digital signal processing architecture for FDM φ-OTDR using hardware delay interferometers. The N delay interferometric products at each fiber position are optimally combined followed by arc centering. The acoustic vibration at each fiber position is then estimated by taking the unwrapped phase.

FIG. 4(A) and FIG. 4(B) are schematic diagrams illustrating: FIG. 3(A), alternative system architecture for frequency-division multiplexed (FDM) φ-OTDR using hardware delay interferometers at each wavelength. FIG. 4(B), alternative digital signal processing architecture for FDM φ-OTDR using hardware delay interferometers. The N delay interferometric products at each fiber position are optimally combined followed by arc centering. The acoustic vibration at each fiber position is then estimated by taking the unwrapped phase.

As may be observed, these figures show two implementations which use coherent detection and differential detection at the receiver. Both implementations use the same generator, which optically combines N different wavelengths, and simultaneously carve them with rectangular pulses p(t)=rect(t/T) at a repetition period of $T_f$ using an acousto-optic modulator (AOM). After amplification and variable optical attenuator to control the launched power, the pulse train is launched into the fiber under test (FUT) via an optical circulator. The same circulator directs the Rayleigh backscatter to the receiver.

In the case of coherent detection, the Rayleigh backscatter associated with each of the N transmitted wavelengths will appear at individual outputs of the optical demultiplexers. The source lasers from the generator are likewise demultiplexed.

Each backscatter component beats with its local oscillator (LO) in a conventional coherent receiver comprising a dual-polarization 90 degree hybrid followed by single-ended or balanced photodetectors followed by analog-to-digital converters (ADCs) which recover the in-phase (I) and quadrature (Q) components of the two fiber polarizations for digital signal processing (DSP).

The DSP operations are shown in FIG. 3(B). For each wavelength k, frequency offset compensation and re-sampling/re-timing are performed, followed by computation of four delay interferometric products $x_k[n]x^*_k[n-\Delta]$, $x_k[n]y^*_k[n-\Delta]$, $y_k[n]y^*_k[n-\Delta]$, and $y_k[n]y^*_k[n-\Delta]$. The 4N delay interferometric products from all the wavelengths are combined as per the method outlined in Eq. (3)(5) to compute ζ[l, m]. Arc-centering is then performed at each fiber position. Acoustic vibration at each fiber position is obtained by taking the unwrapped phase of ζ[l, m].

FIG. 4(A) shows an alternative receiver architecture which uses optical delay interferometers at each output of the optical demultiplexers, followed by single-ended or balanced photodetectors, followed by sampling by ADCs. This configuration is simpler but less flexible than that illustrated in FIG. 3(A), as only a single delay interferometric product is obtained at each wavelength. Moreover, the interferometer delay ΔT is fixed by hardware, whereas in the coherent detection case, Δ can be changed in software. The DSP operations are shown in FIG. 4(B). After re-sampling and re-timing, the N delay interferometric products are processed in exactly the same manner as in the coherent detection case.

There exists a multitude of equivalent architectures to those shown in the figures. For example, the bank of N lasers and optical multiplexer can be replaced by a single seed laser passing through an optical modulator overdriven by a large amplitude electrical sine-wave, followed by any device which can equalize the powers of the generated tones. Provided the wavelengths are closely spaced, the receiver may consist of only one LO laser (the seed laser) and a single coherent receiver with sufficient bandwidth that can recover all N Rayleigh backscatter signals within the baseband. In this case, after reconstruction of the electric field using the I and Q recovered for the two fiber polarizations, the Rayleigh backscatter at each wavelength can be found by frequency offset compensation followed by lowpass filtering in the digital domain.

One aspects of the novelty of our architecture lies in how the various delay interferometric products are combined to form a single output ζ[l, m], and in arc centering at each fiber position l to reduce phase noise and mitigate phase discontinuities. These operations are described previously in the Diversity Combining and Arc Centering Algorithm sections of this disclosure.

While we have presented this disclosure using some specific examples, those skilled in the art will recognize that our teachings are not so limited. Accordingly, this disclosure should be only limited by the scope of the claims attached hereto.

The invention claimed is:

1. A distributed acoustic sensing (DAS) system using phase optical time-domain reflectometry based on Rayleigh scattering comprising:
   an optical interrogator unit that generates optical pulses at one or more optical frequencies and introduces them into an optical fiber under test;
   a receiver unit that detects Rayleigh backscatter from the optical fiber under test, and
   a data processor unit that determines acoustic vibrations experienced by the optical fiber under test by computing a plurality of delay interferometric products based on different combinations of polarizations and/or frequencies of the detected Rayleigh backscatter, adding the interferometric products in phase by aligning their vectors using correlation, followed by bias removal wherein phase rotations $\varphi_{l,k}$ are determined by first choosing an appropriate window size of M samples and then determining a $b_k$ [l, m] term according to the following relationship:

$$k_0 = \max_k \left( \sum_{m=1}^{M} |b_k[l, m]|^2 \right);$$

and
subsequently determining the phase rotations by correlating remaining terms according to $b_k[l, m]$ according to the following:

$$\varphi_{l,k} = \text{angle} \left( \sum_{m=1}^{M} b_k[l, m] b^*_{k_0}[l, m] \right)$$

where $b_k[l, m]$ are delay interferometric products, l is a position index and m is a time index.

2. The system of claim 1 wherein the receiver unit detects the Rayleigh backscatter at each optical frequency of the one or more optical frequencies using a plurality of coherent receivers.

3. The system of claim 1 wherein the receiver unit detects the Rayleigh backscatter at each optical frequency of the one or more optical frequencies using a plurality of optical delay interferometers.

4. The system of claim 1 wherein the optical pulses are introduced into the optical fiber under test at regular intervals (pulse repetition rate) and the Rayleigh impulse response is sampled at the pulse repetition rate.

* * * * *